United States Patent [19]

Yu

[11] Patent Number: 5,553,916
[45] Date of Patent: Sep. 10, 1996

[54] BICYCLE SADDLE WITH A PLURALITY OF SHOCK-ABSORBING SPRINGS AND MEANS FOR ADJUSTING TENSION OF THE SPRINGS

[75] Inventor: Tsai-Yun Yu, Taichung Hsien, Taiwan

[73] Assignee: Selle Tech Industrial Co., Ltd., Taiichung Hsien, Taiwan

[21] Appl. No.: 399,925

[22] Filed: Mar. 7, 1995

Related U.S. Application Data

[63] Continuation-in-part of Ser. No. 306,996, Sep. 16, 1994.

[51] Int. Cl.$^6$ .................. B62J 1/02; B62J 1/10
[52] U.S. Cl. .................. 297/207; 297/208; 297/213; 297/197
[58] Field of Search .................. 297/208, 195.1, 297/197, 213, 284.2, 228.13, 452, 49, 207; 403/13, 12

[56] References Cited

U.S. PATENT DOCUMENTS

| | | | |
|---|---|---|---|
| 607,565 | 7/1898 | Hunt | 297/197 |
| 612,546 | 10/1898 | Leimburg | 297/197 |
| 1,600,523 | 9/1926 | Sudhölter | 297/197 |
| 5,380,326 | 1/1995 | Lin | 403/13 |

FOREIGN PATENT DOCUMENTS

| | | | |
|---|---|---|---|
| 302236 | 2/1929 | United Kingdom | 297/197 |
| 457373 | 11/1936 | United Kingdom | 297/197 |

*Primary Examiner*—Peter M. Cuomo
*Assistant Examiner*—Anthony D. Barfield
*Attorney, Agent, or Firm*—Beveridge, Degrandi, Weilacher & Young

[57] ABSTRACT

A bicycle saddle includes a saddle body, an opening formed through the saddle body and a plurality of spring-retaining holes formed along the periphery of the opening. The bicycle saddle further includes a spring-retaining assembly and a plurality of elongated coil springs connected between the saddle body and the spring-retaining assembly under tension. The spring-retaining assembly includes at least one first connecting member having a threaded hole. The spring-retaining assembly further has at least one second connecting member which has a counterbore. At least one screw member extends through the counterbore of the second connecting member and engaging the threaded hole of the first connecting member to engage the first and second connecting members. Therefore, the first and second connecting members can be moved with respect to one another by rotating the screw member.

4 Claims, 7 Drawing Sheets

BICYCLE SADDLE WITH A PLURALITY OF SHOCK-ABSORBING SPRINGS AND MEANS FOR ADJUSTING TENSION OF THE SPRINGS

This application is a continuation-in-part of application Ser. No. 08/306,996, filed Sep. 16, 1994.

BACKGROUND OF THE INVENTION

1. Field of the Invention

This invention relates to a bicycle saddle having a plurality of shock-absorbing springs, more particularly to a bicycle saddle having a spring-tension-adjusting means.

2. Description of the Related Art

A known bicycle saddle comprises a rigid saddle body which has a front portion, an intermediate portion and a rear portion. The intermediate portion is formed with a generally rectangular opening that extends along the length of the saddle body, and a series of spring-retaining holes adjacent to the front and rear ends of the opening. The bicycle saddle further comprises a plurality of elongated coil springs, each of which has a first end secured to one of the retaining holes adjacent to the front end of the opening and a second end secured to one of the retaining holes adjacent the rear end of the opening. The coil springs serve to absorb shock which is generated when the bicycle saddle is in use.

My co-pending U.S. patent application Ser. No. 08/306, 996, which is assigned to SELLE TECH IND., CO., LTD. filed on Sep. 16, 1994, disclosed a bicycle saddle comprising a rigid saddle body, a rigid spring-retaining plate, and a plurality of elongated coil springs. The saddle body is formed as a loop member and has an opening formed therethrough. The periphery of the opening is formed with a plurality of spring-retaining holes. Also, the retaining plate is formed with a plurality of spring-retaining holes. Each of the coil springs has a first end secured to one of the retaining holes in the saddle body, and a second end secured to one of the retaining holes in the retaining plate. The coil springs extend radially in different directions from the retaining plate to the saddle body to enable the bicycle saddle to absorb shock in a plurality of directions.

Although the above-mentioned bicycle saddle can be used to absorb shock when the bicycle saddle is in use, the tension of the coil springs is fixed when the bicycle saddle is made. Therefore, the tension of the coil springs of the bicycle saddle cannot be adjusted in order to provide a proper shock-absorbing ability according to the weight of the riders.

SUMMARY OF THE INVENTION

It is therefore a main object of this invention to provide an improved bicycle saddle in which the tension of the coil springs can be adjusted to provide a proper shock-absorbing ability according to different users' weight.

Accordingly, the bicycle saddle of this invention comprises a rigid saddle body formed as a loop member, an opening formed through the saddle body and a periphery defining the opening which is formed with a plurality of spring-retaining holes. The bicycle saddle further comprises a rigid spring-retaining assembly which has a plurality of spring-retaining holes, and a plurality of elongated coil springs connected between the saddle body and the spring-retaining assembly under tension. Each of the coil springs has a first end secured to one of the retaining holes in the saddle body, and a second end secured to one of the retaining holes in the spring-retaining assembly.

The spring-retaining assembly includes at least one first connecting member having a threaded hole formed therein, and at least one of the retaining holes of the spring-retaining assembly. The spring-retaining assembly further has at least one second connecting member which has a counterbore, and at least one of the retaining holes of the spring-retaining assembly. At least one screw member extends through the counterbore of the second connecting member and engages the threaded hole of the first connecting member to engage the first and second connecting members. Therefore, the first and second connecting members can be moved with respect to one another by rotating the screw member in order to increase or decrease the tension of the coil springs according to the weight of the rider.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
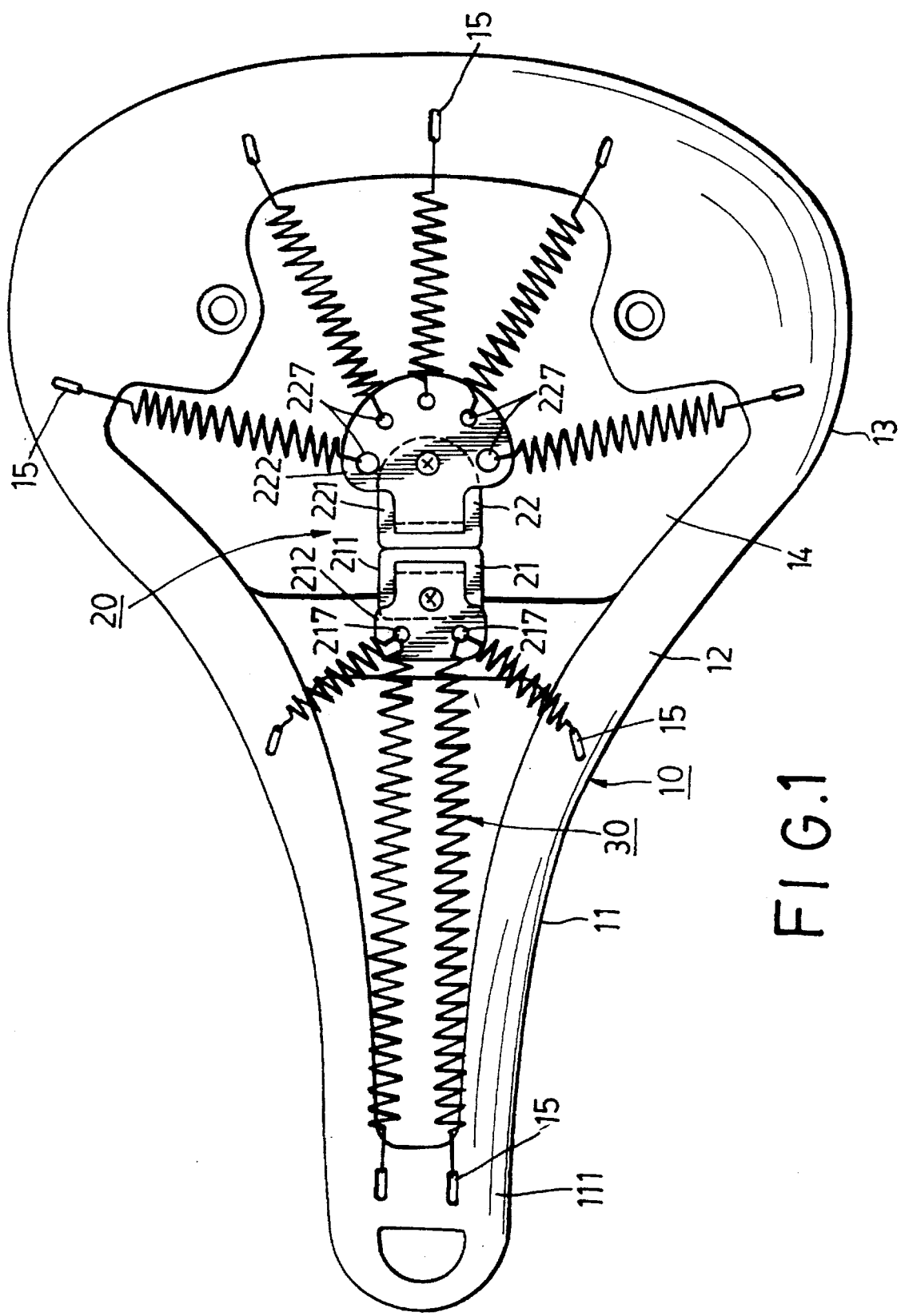
FIG. 1 is a top view of a first preferred embodiment of a bicycle saddle of this invention.
Figure 2:
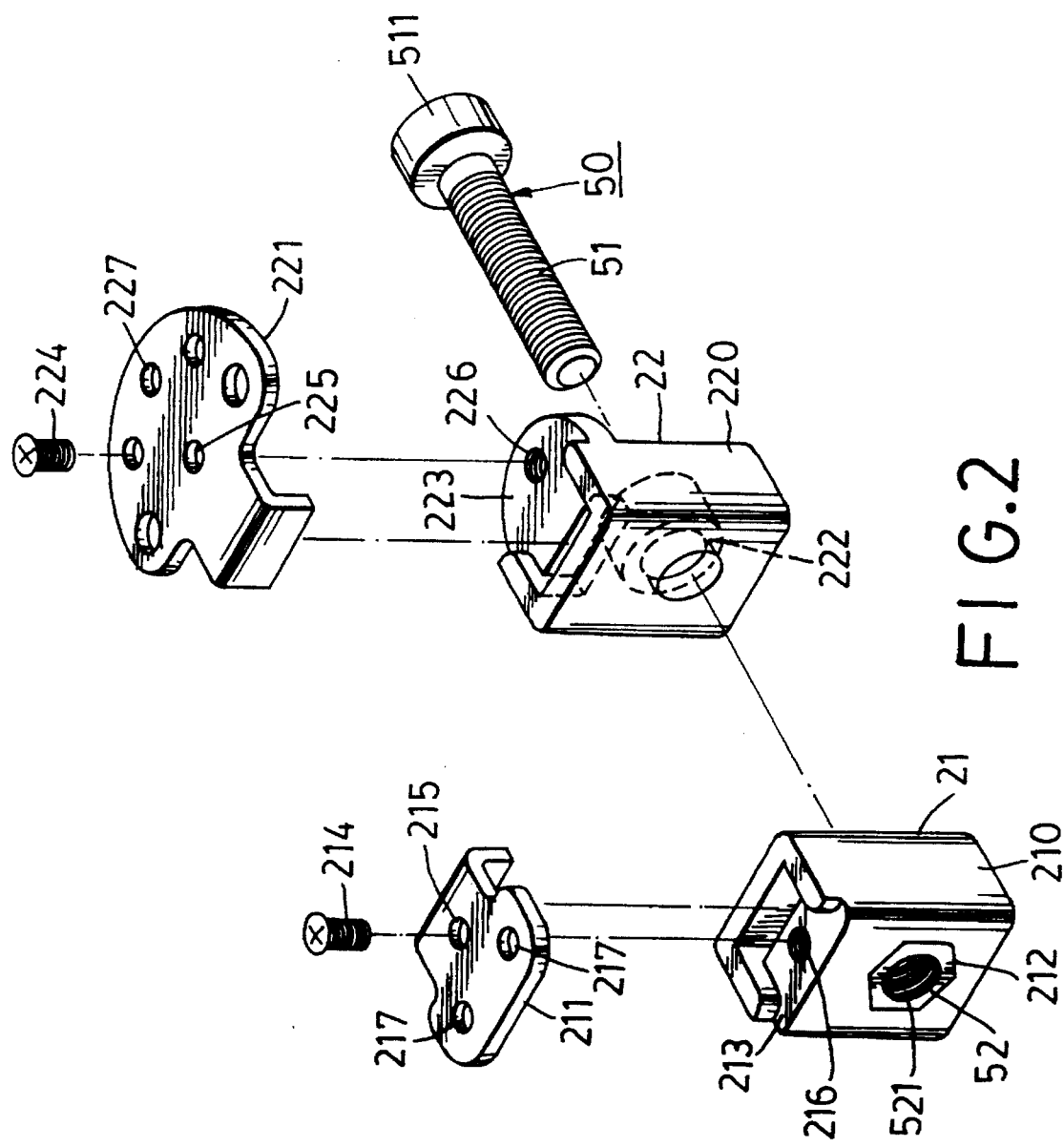
FIG. 2 is an exploded view of the spring-retaining assembly of the bicycle saddle shown in FIG. 1.

Referring to FIGS. 1 and 2, the first preferred embodiment of a bicycle saddle according to the present invention is shown to comprise a saddle body 10 which is preferably made of a rigid plastic material. The saddle body 10 is formed as a loop member and has a front portion 11 with a nose 111, an intermediate portion 12 and a rear portion 13. The saddle body 10 confines an opening 14 that extends from the nose 111 to the rear portion 13. The saddle body 10 has a periphery defining the opening 14 which is formed with a plurality of spring-retaining holes 15 therealong. In this embodiment, there are nine retaining holes 15.

The bicycle saddle 10 further comprises a spring-retaining assembly 20 and a plurality of elongated coil springs 30 connected between the saddle body 10 and the spring-retaining assembly 20 under tension. Referring to FIG. 2, the spring-retaining assembly 20 includes a first connecting member 21 and a second connecting member 22. The first connecting member 21 has a generally rectangular first block 210, which is preferably made of a rigid plastic material, and a first metal plate 211 which is connected to the top face 213 of the first block 210 by a screw 214. The screw 214 extends through a hole 215 in the first metal plate 211 and engages a threaded hole 216 which is formed in the top face 213 of the first block 210. A counterbore 212 is formed through the first block 210. The counterbore 212 has a nut 52 with a threaded hole 521 fixed in a larger end of the counterbore 212. Two spring-retaining holes 217 are formed along the periphery of the first metal plate 211.

The second connecting member 22 has a generally rectangular second block 220 and a semi-circular projection portion 223 formed integrally to the top of the second block 220, which are both preferably made of a rigid plastic material. A counterbore 222 is formed through the second block 220. A second metal plate 221 which is connected to the projection 223 of the second block 220 by a screw 224. The screw 224 extends through a hole 225 in the second metal plate 221 and engages a threaded hole 226 which is formed in the projection 223 of the first block 220. Five spring-retaining holes 227 are formed along the periphery of the first metal plate 221. A screw member 50 with an enlarged head 511 and a threaded shaft 51 extends through the counterbores 222 and 212 of the second and first connecting member 22 and 21 and engages the threaded hole 521 of the nut 52 that is fixed in first connecting member 21 in order to engage the first and second connecting members 21 and 22. Therefore, the first and second connecting members 21, 22 can be moved with respect to one another by rotating the screw member 50. The enlarged head 511 of the screw member 50 has a hexagonal cavity (not shown) formed in the end face of thereof so that the screw member 50 can be rotated by an Allen wrench. The free end 53 of the threaded shaft 51 may be punched in order to form an enlarged portion which prevents the screw member 50 from separating from the nut 52.

Referring once more to FIG. 1, each of the coil springs 30 has a first end secured to one of the retaining holes 15 in the saddle body 10, and a second end secured to one of the retaining holes 217, 227 of the first and second connecting member 21, 22 of the spring-retaining assembly 20. When assembled, the coil springs 30 radiate from the spring-retaining assembly 20 in different directions toward the saddle body 10 and serve to position the spring-retaining assembly 20 at a central portion of the opening 14.

Figure 3:
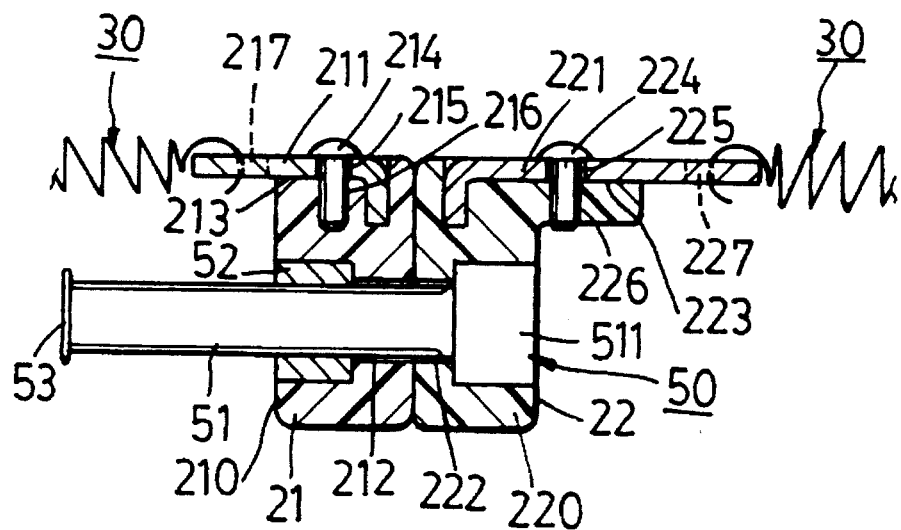
FIG. 3 is a fragmentary sectional view of the spring-retaining assembly of the bicycle saddle of FIG. 1 which is connected to the coil springs under tension.
Figure 4:
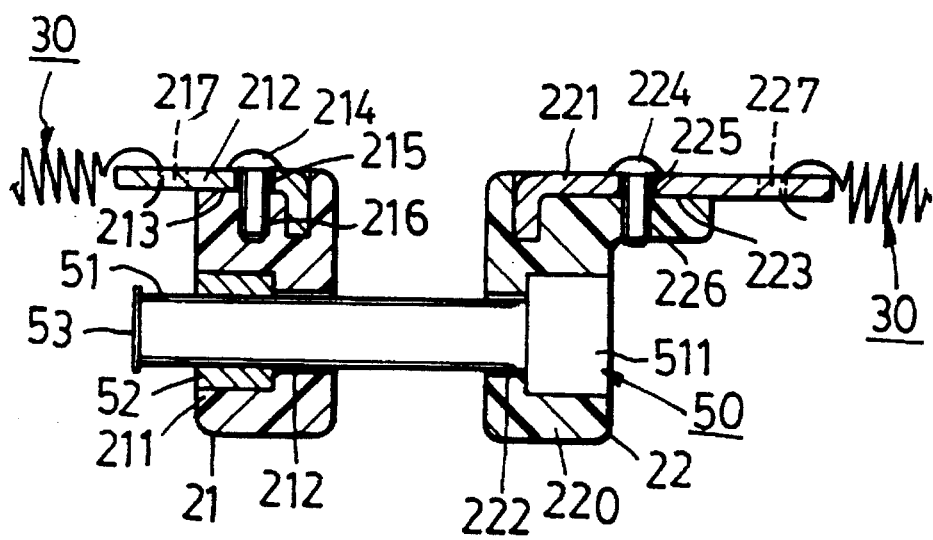
FIG. 4 is a sectional view illustrating the spring-retaining assembly of FIG. 3 being separated from one another in order to reduce the tension of the coil springs.

Referring to FIG. 3, when the first and second connecting members 21, 22 abut one another by rotating the screw member 50, the coil springs 30 have a greater tension and thereby a greater shock-absorbing capability which is suitable for bearing a heavier rider. This is because the coil springs 30 can have shock-absorbing capability after they bear the large weight of the rider. On the contrary, if the rider is light in weight, he may rotate the screw member 50 to move the first and second connecting members 21, 22 away from one another in order to reduce the tension of the coil springs 30, as best illustrated in FIG. 4.

Figure 5:
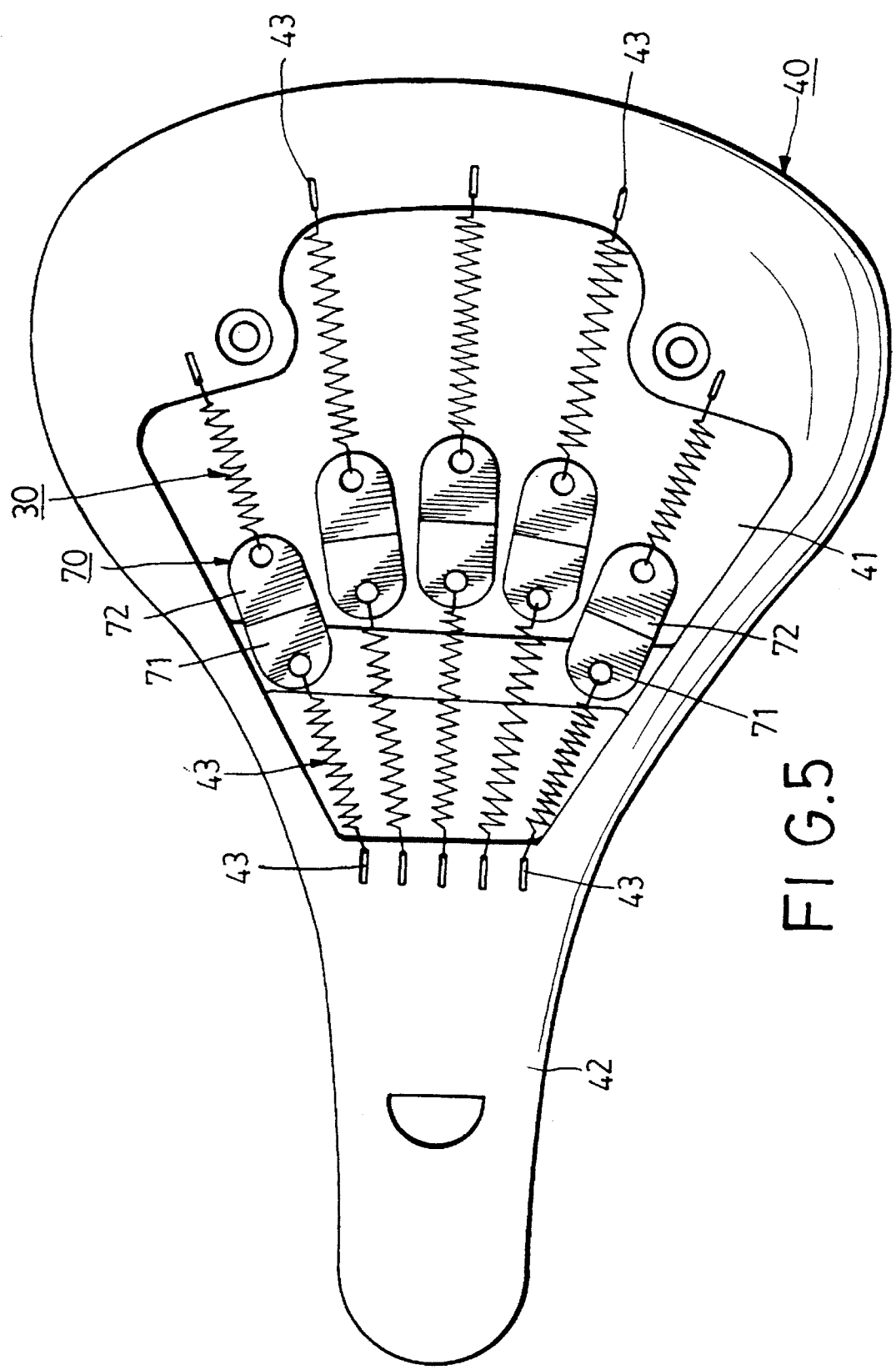
FIG. 5 is a top view of a second preferred embodiment of a bicycle saddle of this invention.
Figure 6:
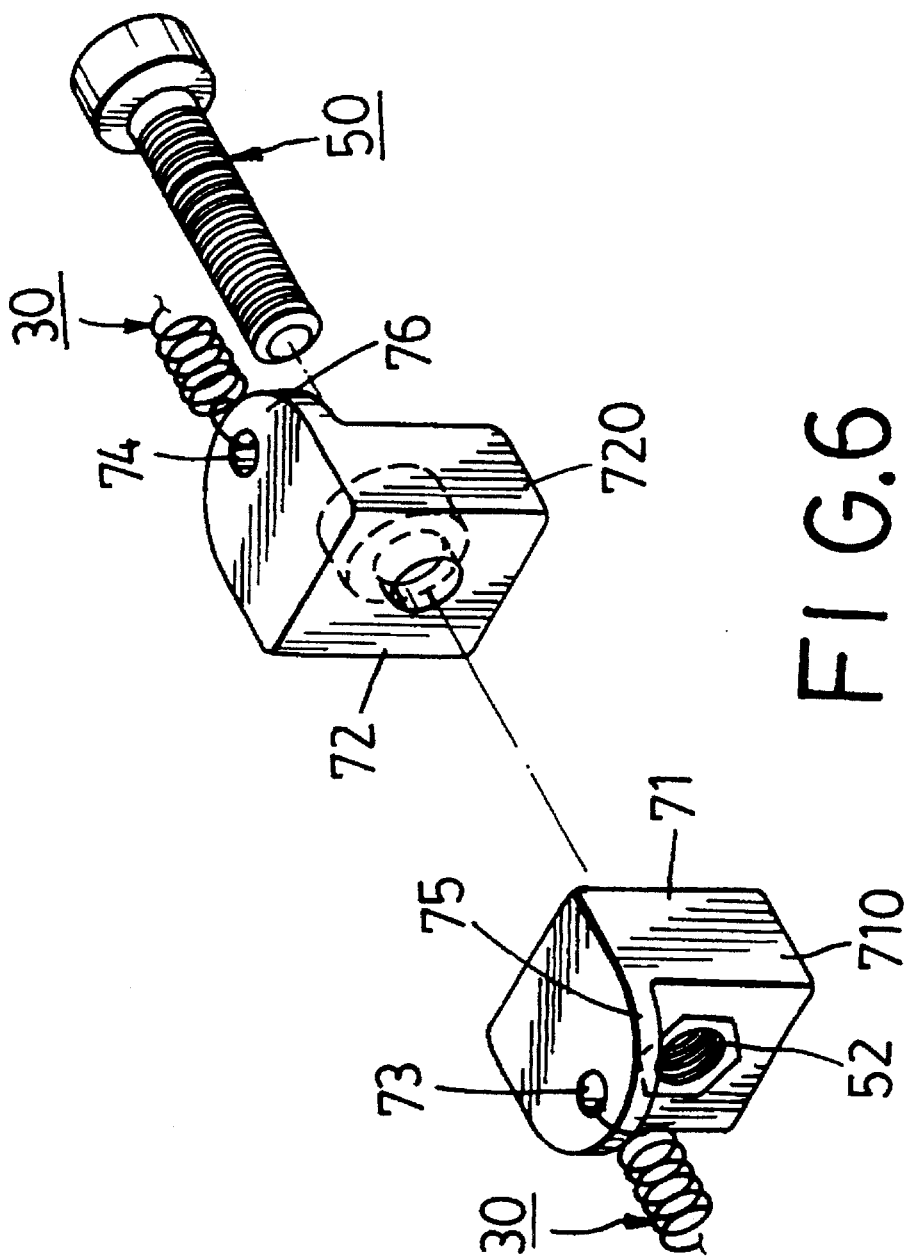
FIG. 6 is an exploded view of the spring-retaining assembly of the bicycle saddle shown in FIG. 5.

FIG. 5 shows a second preferred embodiment of a bicycle saddle of this invention. In this embodiment, the structure of the saddle body 40 of the bicycle saddle is similar to that of the saddle body 10 of the first embodiment except that the generally rectangular opening 41 does not extend to the front portion 42 of the saddle body 40. In addition, in this embodiment, the saddle body 40 has a spring-retaining assembly 70 which includes five first connecting members 71 which are connected to five second connecting members. Referring to FIG. 6, each of the first connecting members 71 has a generally rectangular first block 710 and a semi-circular projection 75 formed integrally with the first block 710. A spring-retaining hole 73 is formed in the projection 75. Each of the second connecting members 72 has a generally rectangular second block 720 and a semi-circular projection 76 formed integrally with the second block 720. A spring-retaining hole 74 is formed in the projection 76. Each of the first and second connecting members 71 and 72 has a coil spring 30 connected to the respective retaining holes 73, 74. The coil springs 30 are connected individually to the spring-retaining holes 43 which are formed along the periphery of the opening 41 of the saddle body 40. Each of the first and second blocks 710 and 720 has a counterbore which has the same structure as the first and second blocks 210 and 220 of the first embodiment. Each of the first connecting members 71 is connected to one of the second connecting members 72 by means of a screw member 50 and nut 52 in a manner similar to that of the first embodiment. Therefore, the tension of the coil springs can be adjusted individually to achieve a better shock-absorbing effect.

Figure 7:
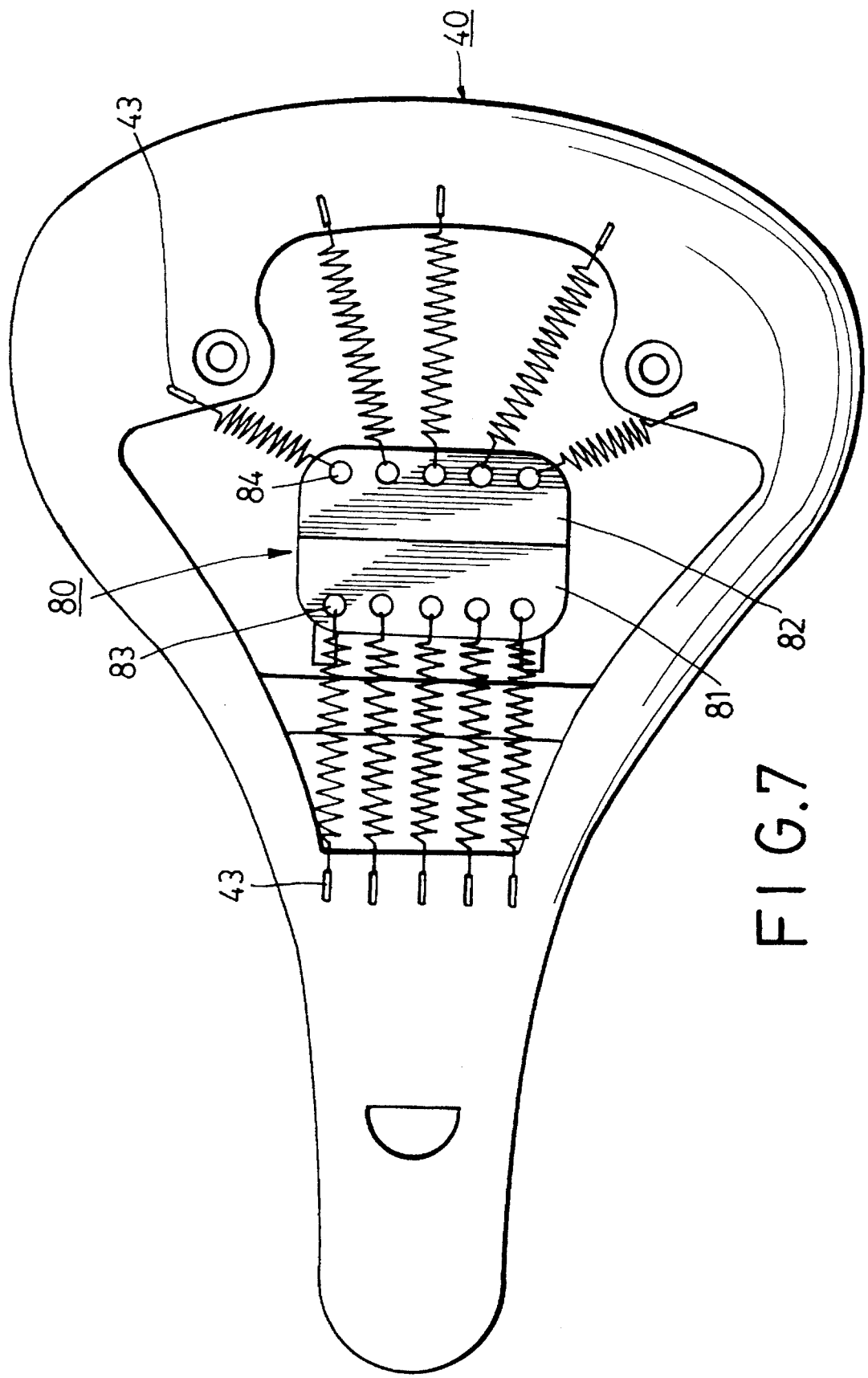
FIG. 7 is a top view of a third preferred embodiment of a bicycle saddle of this invention.
Figure 8:
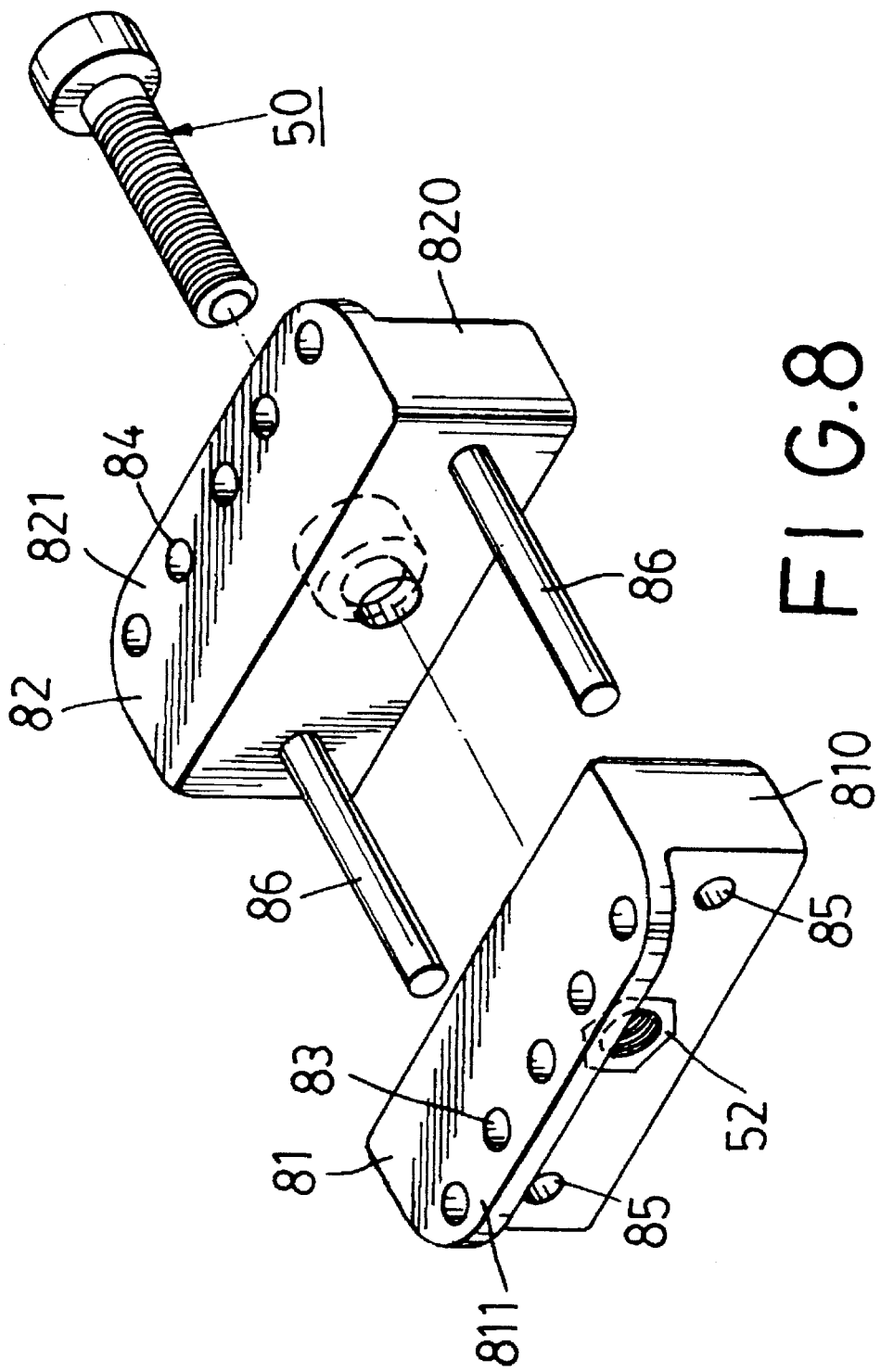
FIG. 8 is an exploded view of the spring-retaining assembly of the bicycle saddle shown in FIG. 7.

FIG. 7 shows a third preferred embodiment of a bicycle saddle of this invention. In this embodiment, the structure of the saddle body 40 of the bicycle saddle is the same as that of the second embodiment. The saddle body 40 has a spring-retaining assembly 80 which includes a first connecting members 81 and a second connecting members 82 connected to the first connecting members 81. Referring to FIG. 8, the first connecting member 81 has a generally rectangular first block 810 and a projection 811 formed integrally with the first block 810. Five spring-retaining holes 83 are formed in the projection 811. The second connecting member 82 has a generally rectangular second block 820 and a projection 821 formed integrally with the second block 820. Five spring-retaining holes 84 are formed in the projection 821. A plurality of coil springs 30 are connected to the retaining holes 83, 84 of the first and second connecting members 81, 82 and the spring-retaining holes 43 of the saddle body 40. Each of the first and second blocks 810 and 820 has a counterbore which has the same structure as the first and second blocks 710 and 720 of the second embodiment. Each of the first connecting members 81 is connected to one of the second connecting members 82 by means of a screw member 50 and nut 52 in a manner similar to that of the second embodiment. The first block 810 has two through-holes 85 and the second block has two rods 86 correspondingly extending through the two through-holes 85 of the first block 810 in order to guide the first connecting member 81 to move stably with respect to the second connecting member 82.

With this invention thus explained, it is apparent that numerous modifications and variations can be made without departing from the scope and spirit of this invention. It is therefore intended that this invention be limited only as indicated in the appended claims.

I claim:

1. A bicycle saddle including a rigid saddle body formed as a loop member, an opening formed through said saddle body and a periphery defining said opening which is formed with a plurality of spring-retaining holes, said bicycle saddle further including a rigid spring-retaining assembly which has a plurality of spring-retaining holes, and a plurality of elongated coil springs connected between said saddle body and said spring-retaining assembly under tension, each of which has a first end secured to one of said retaining holes in said saddle body and a second end secured to one of said retaining holes in said spring-retaining assembly, characterized by:

said spring-retaining assembly including:

at least one first connecting member having a threaded hold formed therein and at least one of said retaining holes of said spring-retaining assembly;

at least one second connecting member detachable from and independent of said first connecting member having a counterbore formed therethrough and at least one of said retaining holes of said spring-retaining assembly; and at least one screw member extending through said counterbore of said second connecting member and engaging said threaded hole of said first connecting member to engage said first and second connecting members.

2. A bicycle saddle as claimed in claim 1, characterized in that said first connecting member includes a first block in which said threaded hole is formed and a first metal plate in which at least one of said retaining holes of said spring-retaining assembly is formed, said first metal plate being connected to a top face of said first block.

3. A bicycle saddle as claimed in claim 2, characterized in that said second connecting member includes a second block in which said counterbore is formed and a second metal plate in which at least one of said retaining holes of said spring-retaining assembly is formed, said second metal plate being connected to a top face of said second block.

4. A bicycle saddle as claimed in claim 3, characterized in that said first block has two through-holes and said second block has two rods correspondingly extending through said two through-holes of said first block.

* * * * *